United States Patent
Wagner et al.

(10) Patent No.: US 8,834,835 B2
(45) Date of Patent: *Sep. 16, 2014

(54) ULTRA HIGH TEMPERATURE SHIFT CATALYST WITH LOW METHANATION

(71) Applicants: Clariant Corporation, Charlotte, NC (US); L'Air Liquide, Societe Anonyme Pour L'Etude Et L'Exploitation Des Procedes Georges Claude, Paris (FR)

(72) Inventors: Jon P. Wagner, Louisville, KY (US); Michael W. Balakos, Buckner, KY (US); Chandra Ratnasamy, Louisville, KY (US)

(73) Assignees: Clariant Corporation, Charlotte, NC (US); L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,394

(22) Filed: Jan. 28, 2013

(65) Prior Publication Data
US 2013/0134359 A1 May 30, 2013

Related U.S. Application Data

(62) Division of application No. 13/358,832, filed on Jan. 26, 2012, now abandoned, which is a division of application No. 12/048,673, filed on Mar. 14, 2008, now Pat. No. 8,119,558.

(51) Int. Cl.
| | | |
|---|---|---|
| *C01B 3/12* | (2006.01) | |
| *C01B 3/16* | (2006.01) | |
| *C01B 3/18* | (2006.01) | |
| *C01B 3/38* | (2006.01) | |
| *C07C 1/02* | (2006.01) | |
| *B01J 21/00* | (2006.01) | |
| *B01J 21/04* | (2006.01) | |
| *B01J 23/00* | (2006.01) | |
| *B01J 23/02* | (2006.01) | |
| *B01J 23/06* | (2006.01) | |
| *B01J 23/08* | (2006.01) | |
| *B01J 20/00* | (2006.01) | |
| *B01J 23/36* | (2006.01) | |
| *B01J 35/10* | (2006.01) | |
| *B01J 23/10* | (2006.01) | |
| *B01J 21/06* | (2006.01) | |

(52) U.S. Cl.
CPC .. *C01B 3/16* (2013.01); *B01J 23/10* (2013.01); *B01J 23/36* (2013.01); *B01J 35/1014* (2013.01); *B01J 35/1019* (2013.01); *Y10S 502/524* (2013.01); *B01J 21/06* (2013.01); *B01J 21/066* (2013.01)
USPC ........... 423/656; 423/655; 252/373; 502/241; 502/302; 502/303; 502/304; 502/305; 502/340; 502/341; 502/344; 502/349; 502/355; 502/415; 502/439; 502/524

(58) Field of Classification Search
USPC .......... 423/655, 656; 502/241, 302–305, 340, 502/341, 344, 349, 355, 415, 439; 252/373
See application file for complete search history.

(56) References Cited

U.S. PATENT DOCUMENTS

| | | | | |
|---|---|---|---|---|
| 3,755,556 A | * | 8/1973 | Aldridge | 423/655 |
| 3,850,840 A | * | 11/1974 | Aldridge | 252/373 |

(Continued)

*Primary Examiner* — Cam N Nguyen
(74) *Attorney, Agent, or Firm* — Scott R. Cox

(57) ABSTRACT

A catalytic water gas shift process at temperatures above about 450° C. up to about 900° C. or so wherein the catalyst includes rhenium deposited on a support, preferably without a precious metal, wherein the support is prepared from a high surface area material, such as a mixed metal oxide, particularly a mixture of zirconia and ceria, to which may be added one or more of a high surface area transitional alumina, an alkali or alkaline earth metal dopant and/or an additional dopant selected from Ga, Nd, Pr, W, Ge, Fe, oxides thereof and mixtures thereof.

20 Claims, 1 Drawing Sheet

(56) References Cited

U.S. PATENT DOCUMENTS

| | | |
|---|---|---|
| 6,555,088 B1 * | 4/2003 | Baumann et al. .............. 423/656 |
| 6,723,298 B1 * | 4/2004 | Baumann et al. ........... 423/437.2 |
| 6,777,117 B1 * | 8/2004 | Igarashi et al. ............... 429/412 |
| 6,846,475 B1 * | 1/2005 | Taguchi et al. ............... 423/656 |
| 7,160,533 B2 * | 1/2007 | Hagemeyer et al. .......... 423/655 |
| 7,160,534 B2 * | 1/2007 | Hagemeyer et al. .......... 423/655 |
| 7,179,442 B2 * | 2/2007 | Hagemeyer et al. .......... 423/655 |
| 7,270,798 B2 * | 9/2007 | Hagemeyer et al. .......... 423/655 |
| 7,357,911 B2 * | 4/2008 | Ruettinger et al. ........... 423/655 |
| 7,744,849 B2 * | 6/2010 | Hagemeyer et al. .......... 423/656 |
| 7,824,455 B2 * | 11/2010 | Faur-Ghenciu et al. ..... 48/198.3 |
| 7,824,656 B2 * | 11/2010 | Idem et al. .................... 423/651 |
| 7,871,957 B2 * | 1/2011 | Willigan et al. .............. 502/304 |
| 2004/0184986 A1 * | 9/2004 | Hagemeyer et al. .......... 423/656 |

\* cited by examiner

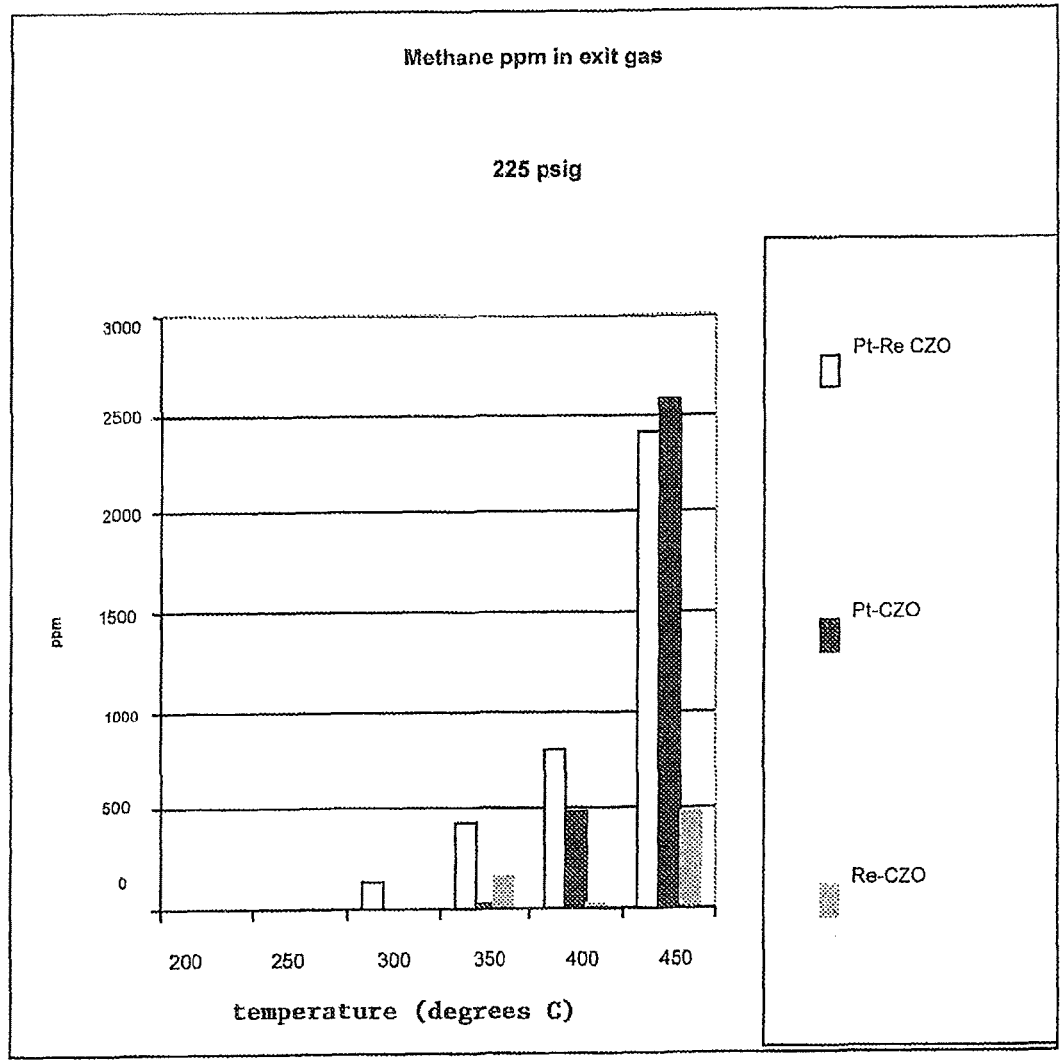

ULTRA HIGH TEMPERATURE SHIFT CATALYST WITH LOW METHANATION

RELATED APPLICATION

This application is a divisional application of application Ser. No. 13/358,832, filed Jan. 26, 2012, which is a divisional application of application Ser. No. 12/048,673, filed Mar. 14, 2008, now U.S. Pat. No. 8,119,558.

The invention relates to water gas shift catalysts, particularly for use at ultra high temperatures. More particularly, one embodiment of the invention relates to a water gas shift catalyst comprising rhenium deposited upon a support, wherein the support is a high surface area material, such as a mixed metal oxide. In a further preferred embodiment, no precious metals, particularly platinum, palladium, ruthenium or rhodium are added to the catalyst. A further embodiment adds various dopants and/or additives to the catalyst and/or the support for the catalyst to enhance its performance.

BACKGROUND OF INVENTION

Conventional iron-chrome high temperature water gas shift catalyst typically operate at temperatures from 350° C. to 450° C. and have been proven to be active and stable. However, there are unique $H_2$ production designs being developed where active, stable and selective water gas shift catalysts are required to operate at much higher temperatures. These temperatures can occur, for example, in reforming systems that have been developed for on-site hydrogen production for industrial and high temperature fuel cell applications. In these situations the temperature for the first water gas shift stage can be as high as 900° C., thereby matching the reforming catalyst exit temperature and/or matching the temperature of the fuel cell stack. At these temperatures conventional iron-chrome catalysts degrade due to physical loss of strength. When operated at these temperatures, these catalysts also are prone to make heavy hydrocarbons via a Fischer-Tropsch reaction.

On-site hydrogen production units and high temperature fuel cell power plants that utilize a fuel cell stack for producing electricity from a hydrocarbon fuel are known. One example of these power plants is a molten carbonate or a solid oxide fuel cell where the operating temperatures are from 600-1000 C. With these systems, matching the water gas shift catalyst operating temperature to the reforming catalyst or fuel cell operating temperatures is beneficial as the system is simplified by elimination of heat exchangers and other associated equipment and controls.

The hydrocarbon fuel for such fuel cell stacks can be derived from a number of conventional fuel sources, with preferred fuel sources including, but not limited to, natural gas, propane and LPG.

In order for the hydrocarbon fuel to be useful in the fuel cell stack, it must first be converted to a hydrogen rich fuel stream. After desulfurization, the hydrocarbon fuel stream typically flows through a reformer, wherein the fuel stream is converted into a hydrogen rich fuel stream at temperatures up to 900° C. This converted fuel stream contains primarily hydrogen, carbon dioxide, water and carbon monoxide. The quantity of carbon monoxide can be fairly high, up to 15% or so.

Anode electrodes, which form part of the fuel cell stack, are adversely affected by high levels of carbon monoxide. Accordingly, it is necessary to reduce the quantity of carbon monoxide in the fuel stream prior to passing it to the fuel cell stack. Reduction of the quantity of carbon monoxide is typically performed by passing the fuel stream through a water gas shift converter. In addition to reducing the quantity of carbon monoxide in the fuel stream, such water gas shift converters also increase the quantity of hydrogen in the fuel stream.

Water gas shift reactors are well known and typically contain an inlet for introducing the fuel stream containing carbon monoxide into a reaction chamber, a down stream outlet, and a catalytic reaction chamber, which is located between the inlet and outlet. The catalytic reaction chamber typically contains catalytic material for converting at least a portion of the carbon monoxide and water in the fuel stream into carbon dioxide and hydrogen. The water gas shift reaction is an exothermic reaction represented by the following formula:

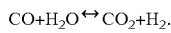

$$CO + H_2O \leftrightarrow CO_2 + H_2.$$

Water gas shift reactions are usually carried out in two stages: a high temperature stage, at temperatures typically from about 350° C. to 450° C. and a low temperature stage at temperatures typically from 180° C. to 240° C. While the lower temperature reactions favor more complete CO conversion, the higher temperature reactions allow recovery of the heat of reaction at a sufficient temperature level to generate high pressure steam.

Because of various unique operating conditions, as discussed above, water gas shift reactions sometimes occur at temperatures above 550° C. and even as high as 900° C. or so. However, at these temperatures, the excess production of methane and the formation of higher hydrocarbons, generally by a Fischer Tropsch reaction, by the water gas shift catalyst are significant issues.

In addition, conventional water gas shift catalysts are not able to physically withstand these higher operating temperatures. These high temperatures are experienced in reformer designs where the high temperature reforming steps are thermally integrated in so-called heat exchanger reactors. Such high temperatures also occur when the water gas shift catalysts are thermally integrated with high temperature fuel cells.

There are a number of water gas shift catalysts that are known in the art. For instance, known water gas shift catalysts may contain chromium, copper or precious metals, preferably platinum, palladium, rhodium or ruthenium, as the active component, deposited on a support. In one preferred embodiment Pt and/or Ru and/or Pd and/or Rh are deposited on a conventional support. Such precious metal based water gas shift catalyst generally operate at 300° C. to 400° C. Conventional iron-chrome water gas shift catalysts are generally operated at temperatures from 350° C. to 450° C.

Notwithstanding the existence of various compositions for catalysts for use in water gas shift converters, there is still a need for improvements in the performance of these water gas shift catalysts, particularly in activity, stability and limitation on methanation and higher hydrocarbon production at high temperatures above 550° C. up to 900° C. or so. Further, at these high temperatures, conventional Water gas shift catalysts physically degrade.

In addition, when conventional water gas catalysts are modified to prevent the formation of higher molecular weight hydrocarbons and by-products, activity of the catalysts is frequently reduced.

Many precious metal water gas shift catalysts, particularly platinum, rhodium, palladium and/or ruthenium-based water gas shift catalysts, cause methanation of CO and/or $CO_2$ as a side reaction when operated at temperatures above about 325° C. A large quantity of the hydrogen present in the feed stream can be consumed by these methanation reactions and thereby, reduce the overall yield of hydrogen. Further, methanation of carbon oxides is accompanied by a strong exothermic reaction which causes a rapid temperature increase, thereby making control of the reaction difficult and reducing the stability of the catalyst.

For purposes of this disclosure "high or higher temperature" water gas shift reactions are those that occur at a temperature greater than about 450° C., generally greater than 550° C. and up to as high as about 900° C., or so.

Accordingly, it is one object of one embodiment of the invention to provide an improved water gas shift catalyst that retains activity to achieve equilibrium, particularly at high temperatures.

It is a further object of one embodiment of the invention to provide an improved water gas shift catalyst for use at high temperatures that does not result in any substantial methanation reactions or the production of substantial quantities of higher hydrocarbons.

It is the further object of one embodiment of the invention to provide an improved water gas shift catalyst with increased stability over the lifetime of the catalyst.

It is further object of one embodiment of the invention to provide a process for the preparation of these improved water gas shift catalysts.

It is understood that the forgoing detailed description is explanatory only and not restrictive of the invention.

SUMMARY OF THE INVENTION

In accordance with one embodiment of the invention, there is provided an improved water gas shift catalyst for high temperature reactions comprising rhenium deposited upon a support, wherein the support comprises a high surface area material, preferably a metal oxide support.

A further embodiment of the invention comprises an improved water gas shift catalyst, especially for use at high temperatures with low methanation and reduced production of higher hydrocarbons, comprising rhenium deposited upon a support, wherein the support comprises a high surface area material, preferably a metal oxide support, and wherein no precious metals are added to the catalyst, particularly platinum, rhodium, palladium or ruthenium.

A further embodiment of the invention comprises an improved water gas shift catalyst for use at high temperatures comprising rhenium deposited upon a support without a precious metal dopant, wherein the support comprises a high surface area material, preferably a metal oxide and an alumina, preferably a transitional phase, high surface area alumina, more preferably gamma alumina.

A further embodiment of the invention comprises an improved water gas shift catalyst for use at high temperatures comprising rhenium deposited upon a support without a precious metal dopant, wherein the support comprises a high surface area material, preferably a metal oxide, wherein an alkali or alkaline earth metal dopant is added to the catalyst and/or the support.

A further embodiment of the invention comprises a water gas shift reaction for use at high temperatures whereby at least a portion of the carbon monoxide and water in a fuel stream is converted to hydrogen and carbon dioxide by utilization of a catalyst comprising rhenium deposited on a support, preferably without a precious metal dopant, wherein the support comprises a high surface area material, particularly a metal oxide and wherein there is low production of methane and higher hydrocarbons.

A further embodiment of the invention comprises a process for the preparation of an improved water gas shift catalyst for use in high temperatures with low methanation and low production of higher hydrocarbons comprising preparing or selecting a support, wherein the support comprises a high surface area material, preferably a metal oxide support, wherein the metal oxides are selected from cerium oxide, zirconium oxide, titanium oxide, silicon oxide, neodymium oxide, praseodymium oxide, yttrium oxide, samarium oxide, lanthanum oxide, tungsten oxide, molybdenum oxide, calcium oxide, chromium oxide, magnesium oxide, barium oxide, strontium oxide, and mixtures thereof. In one preferred embodiment, at least two of these metal oxides are mixed to form the high surface area support. In a more preferred embodiment, the mixed metal oxides comprise zirconia and ceria. Following preparation or selection of the support, rhenium, preferably with no precious metal dopants, and optionally with an alkali or alkaline earth metal oxide dopant, are deposited or impregnated on the support of the catalyst.

BRIEF DESCRIPTION OF THE DRAWINGS

FIG. 1 compares the methane production of three catalysts on a ceria/zirconia support, wherein the active metal component on the catalysts comprise respectively, platinum and rhenium, platinum alone or rhenium alone operated at various temperatures up to 450° C. and at a pressure of 225 psig (15.8 bar).

DETAILED DESCRIPTION OF AN EMBODIMENT OF THE INVENTION

The water gas shift catalyst for use at high temperature of one embodiment comprises rhenium deposited upon a support, wherein the support comprises a high surface area material. For purposes of this disclosure "high surface area" means from about 30 to about 200 $m^2/g$ prior to usage in a reactor.

One preferred high surface area material is a metal oxide, which may be selected from the following: zirconia, ceria, titania, silica, lanthana, praseodymium oxide, neodymium oxide, yttria, samarium oxide, tungsten oxide, molybdenum oxide, calcium oxide, chromium oxide, manganese oxide, barium oxide, strontium oxide and magnesium oxide. One particularly preferred support comprises a mixed metal oxide with the metal oxides selected from the foregoing list, preferably comprising zirconia and ceria with the preferred ratio of zirconia to ceria being about 1 to about 10 to about 10 to about 1. In another particularly preferred embodiment, praseodymia and/or neodymia are added to the ceria/zirconia support. Each of the praseodymia and/or neodymia preferably comprises from about 1% to about 30% of the support, by weight. When both are present in the support, the ratio of the praseodymia to the neodymia is preferably from 1 to 1 to about 3 to 1.

The mixed metal oxide support can be produced by blending together the metal oxides using conventional procedures or the mixed metal oxides can be purchased from conventional sources separately or after combination of the separate metal oxides.

Alternatively, the high surface area material may comprise a promoted alumina, preferably gamma alumina, promoted with dopants including oxides selected from cerium, zirconium, lanthanum, yttrium, praseodymium, neodymium, samarium, tungsten, barium, strontium and molybdenum and the like and mixtures thereof. One particularly preferred high surface area material comprises gamma alumina promoted with ceria, zirconia and barium oxide.

In a further alternative embodiment, the high surface area material comprises a high surface ceria, titania, zirconia, or silica and mixtures thereof.

To form the support, the high surface area materials, if multiple materials are used, are physically mixed by conventional procedures. Conventional liquids, such as water and/or acetic acid are preferably added to the high surface area materials to permit them to be processed, for example, by extrusion, to form extrudates, or to form tablets, or to form a slurry to be washcoated on a conventional monolith or other substrate.

In a particularly preferred embodiment, no precious metal is added to the catalyst of the invention. Many prior art water gas shift catalysts have contained as the active metal component one or more precious metals, preferably platinum, rhodium, palladium and/or ruthenium. For purposes of this disclosure, "precious metals" include gold, silver, platinum, palladium, iridium, rhodium, osmium, and ruthenium.

The inventors have surprisingly discovered that when water gas shift catalysts containing these precious metals are utilized in water gas shift reactions conducted at temperatures of the feedstream greater than about 325° C., and certainly at temperatures greater than 450° C., methane is often produced by the catalysis of CO or $CO_2$ with hydrogen. The production of methane during the water gas shift reaction is a side reaction that reduces the quantity of hydrogen that is present in the feed stream and also increases the temperature of the feedstream, because the methanation reaction is highly exothermic. Because hydrogen production is diminished by this methanation reaction, the methanation reaction is a major disadvantage from the use of precious metal water gas shift catalyst at high temperatures.

The inventors have surprising discovered that when the precious metal(s) are removed from these catalysts and replaced with rhenium, the production of methane is substantially reduced and the CO conversion is maintained at adequate levels when the temperature of the WGS reaction is greater than about 450° C., particularly when it is greater than 550° C., up to about 900° C. or so. This was a surprising result and unanticipated as it was assumed that a rhenium based catalyst would react in a similar manner to prior art precious metal based water gas shift catalysts. Thus, in a preferred embodiment the catalyst of the invention does not include any precious metals, even though precious metals, particularly platinum, palladium, rhodium and/or ruthenium, have been utilized on high temperature water gas shift catalysts of the prior art.

The inventors have also surprisingly discovered that when precious metals are removed from WGS catalysts and replaced with rhenium, the levels of higher hydrocarbons are also reduced when the water gas reaction occurs at high temperatures greater than about 325° C., especially at temperatures above about 450° C.

The quantity of the rhenium that is deposited on the support is from about 0.05 to about 10% by weight, preferably from about 0.1 to about 5% by weight.

In an alternative embodiment, there is added to the high surface area material, up to about 40%, by weight, of an alumina. The preferred alumina is a transitional phase, high surface area alumina, more preferably a gamma alumina, with a surface area greater then about 200 $m^2/g$. The alumina is blended with the high surface area material to assist in binding the support materials together. By use of the transitional phase, high surface area alumina, a support with improved mechanical stability, especially at higher temperatures, is produced. (The referenced "support" is the support for the rhenium and other dopants, if any, and does not refer to the use of a monolith or other such mechanical support used with a catalytic coating.)

In an alternative embodiment, an alkali or alkaline earth metal oxide is added to the support as a dopant, preferably comprising from about 0.1 to about 10% by weight, and more preferably 1.0 to 1.5%, by weight of the support. In a preferred embodiment the dopant is an alkali metal oxide selected from sodium, potassium, cesium and rubidium oxides and mixtures thereof with sodium and/or potassium oxides particularly preferred. When an alkali or alkaline earth metal dopant is added, it can be added to the support with the rhenium or it can be combined with the other components of the support at any stage in the processing of the support. The dopant can be added by conventional procedures, such as impregnation. In a preferred embodiment, the alkali or alkaline earth metal dopant is impregnated into the support after formulation of the support.

In a further preferred embodiment, additional dopants may be added to the catalyst which dopants are selected from Ga, Nd, Pr, W, Ge, and Fe, and their oxides and mixtures thereof, with Ga and Nd and their oxides preferred.

Once the support has been prepared, the rhenium, alkali or alkaline earth metal oxide dopant, and additional dopant, if desired, are deposited upon the support using conventional procedures, such as impregnation. In one preferred procedure the rhenium and dopants, if desired, are impregnated onto the support material in the form of a salt or other type of solution. For example, for the deposition of rhenium, the support material is immersed in a rhenium solution, such as perrhenic acid, and then dried and calcined at a temperature from about 350° to about 650° C. for about 1 to about 5 hours to transform the rhenium salt to rhenium oxide. Depending upon the target loading, multiple impregnation steps may be needed.

After formation of the water gas shift catalyst, its surface area is preferably at least about 30 $m^2/g$, more preferably from about 40 to about 100 $m^2/g$.

The water gas shift catalyst of the preferred embodiment preferably is produced in the form of moldings, especially in the form of spheres, pellets, rings, tablets or extruded products, in which the later are formed mostly as solid or hollow objects in order to achieve higher geometric surfaces with a simultaneously low resistance to flow. Alternatively, monoliths, or other substrates, are coated with the catalytic materials as preferred embodiments.

The catalyst is preferably employed in a process in which carbon monoxide and steam are converted to hydrogen and carbon dioxide at a temperature above 450° C., preferably above 550° C., and up to about 900° C. or so and under pressures above ambient, preferably above about 50 psi (3.4 bar), more preferably above about 100 psi (6.9 bar), and most preferably above about 150 psi (10.3 bar) up to about 400 psi, (28 bar) or so.

In a preferred embodiment the carbon monoxide comprises from about 1 to about 15% of the feed stream and the molar ratio of the steam to the dry gas is from about 0.1 to about 5.

It has surprisingly been discovered that there is adequate CO conversion in comparison to the performance of conventional water gas shift catalysts when the catalysts of the disclosed embodiments are used at high temperatures with a significant reduction in methanation and other hydrocarbon by-products.

It has also been surprisingly discovered that adequate water gas shift activity is retained even without the presence of precious metals on the catalyst, particularly platinum, rhodium, palladium and/or ruthenium.

Further, it was surprisingly discovered that catalysts of the invention retain adequate water gas shift conversions even at temperatures greater than 450° C. with reduced methanation, even when the temperature of the feedstream approaches 900° C. or so.

EXAMPLES

Catalysts in the form of tablets are produced for use in a reactor. Each catalysts is prepared on a ceria/zirconia support. The ceria/zirconia support is purchased from a conventional supplier and comprises 80% ceria and 20% zirconia. Impregnated on the support is one of the following: a) 0.5% platinum in the form of platinum oxide b) 0.38% rhenium in the form of rhenium oxide or c) 0.5% of a combination of 0.25% rhenium and 0.25% platinum in the form of rhenium oxide and platinum oxide combined. A water gas shift reaction for each catalyst is run at varying temperatures and at a pressure of 225 psig (15.5 bar). At temperatures of 400° C. and especially at temperatures of 450° C., the catalyst comprising rhenium oxide on the ceria/zirconia support produce the least quantity of methane in the exit gas. The production of methane for each of the three catalysts at different temperatures is shown on FIG. 1.

The conditions of the reactor are a dry gas inlet comprising 10% CO, 15% $CO_2$, 10% $N_2$, with the remaining amount comprising hydrogen. The temperature within the reactor is set at different temperatures from 200° C. to 450° C. The pressure is 225 psig (15.5 bar) with a DGSV of 27,200 l/hr, a wet gas space velocity of 40,000 l/hr and a S/G ratio of 0.47. The gas stream is passed over a catalyst bed under these conditions for various hours on stream.

From this information it is clear that catalysts comprising rhenium deposited on a support comprising high surface area materials produce a water gas shift catalyst with lower production of methane at temperatures of 400° C. and 450° C.

Accordingly, the inventors have discovered that catalysts utilizing rhenium deposited on a support prepared from one or more high surface area materials when operated at high temperatures retained adequate water gas shift activity with low methanation and reduced production of higher hydrocarbons in comparison to precious metal based WGS catalysts.

The inventors have also discovered that the performance of these catalysts may be improved by the addition of a high surface area transitional alumina, preferably gamma alumina, as an additional component of the support.

The inventors have also discovered that the performance of these catalysts may be further improved by impregnating the catalysts with dopants selected from Ga, Nd, Pr, W, Ge, and Fe and their oxides and mixtures thereof.

Although one or more embodiments of the invention have been described in detail, it is clearly understood that the descriptions are in no way to be taken as limitations. The scope of the invention can only be limited by the appended claims.

The invention claimed is:

1. A high temperature water gas shift process comprising preparing a feed stream comprising carbon monoxide and steam, and
passing that feed stream over a water gas shift catalyst at a temperature from about 450° C. to about 900° C.,
wherein the catalyst comprises rhenium deposited on a support and wherein the support comprises a high surface area material with a surface area from about 30 m²/g to about 200 m²/g.

2. The water gas shift process of claim 1, wherein the high surface area material of the support comprises two or more metal oxides selected from the group consisting of oxides of cerium, zirconium, lanthanum, yttrium, praseodymium, neodymium, samarium, tungsten, barium, strontium and molybdenum and mixtures thereof.

3. The water gas shift process of claim 1, wherein the high surface area material of the support comprises a mixed metal oxide comprising two or more metal oxides selected from the group consisting of zirconia, ceria, praseodymia and neodymia.

4. The water gas shift process of claim 1, wherein the high surface area material of the support comprises a transitional phase, high surface area promoted alumina, wherein the alumina is promoted with an oxide selected from oxides of cerium, zirconium, lanthanum, yttrium, praseodymium, neodymium, samarium, tungsten, barium, strontium and molybdenum and mixtures thereof.

5. The water gas shift process of claim 1, wherein the catalyst does not include platinum, palladium, rhodium or ruthenium.

6. The water gas shift process of claim 1, wherein rhenium comprises from about 0.05 to about 10% of the catalyst, by weight.

7. The water gas shift process of claim 1, wherein the support for the catalyst further comprises praseodymium oxide or neodymium oxide or both.

8. The water gas shift process of claim 1 wherein the catalyst further comprises an alkali or alkaline earth metal dopant.

9. The water gas shift process of claim 8, wherein the dopant of the catalyst is selected from the group of consisting of oxides of sodium, potassium, cesium, and rubidium and mixtures thereof.

10. The water gas shift process of claim 8, wherein the dopant of the catalyst comprises from about 0.1 to about 10% of the catalyst, by weight.

11. The water gas shift process of claim 1, wherein a dopant is added to the catalyst, and wherein the dopant is selected from the group consisting of Ga, Nd, Pr, W, Ge and Fe, their oxides and mixtures thereof.

12. The water gas shift process of claim 1 wherein the feed stream is passed over the water gas shift catalyst at a temperature from about 550° C. to 900° C.

13. A high temperature water gas shift process comprising preparing a feed stream comprising carbon monoxide and steam, and
passing that feed stream over a water gas shift catalyst at a temperature from about 450° C. to about 900° C.,
wherein the water gas shift catalyst comprises rhenium deposited on a support, wherein the support comprises a mixture of metal oxides comprising zirconia and ceria, and wherein the catalyst does not include any precious metal from the group consisting of platinum, palladium, rhodium, ruthenium, iridium, osmium, silver, gold and mixtures thereof.

14. The water gas shift process of claim 13, wherein the metal oxides of the support further comprise praseodymium oxide or neodymium oxide.

15. The water gas shift process of claim 13 wherein the feed stream is passed over the water gas shift catalyst at a temperature from about 550° C. to 900° C.

16. A high temperature water gas shift process comprising preparing a feed stream comprising carbon monoxide and steam, and
passing that feed stream over a water gas shift catalyst at a temperature from about 450° C. to about 900° C.,
wherein the catalyst comprises rhenium on a support, wherein the support comprises two or more metal oxides selected from the group consisting of ceria, zirconia, praseodymia and neodymia, and an alkali or alkaline earth metal dopant, and wherein the catalyst does not include any precious metal selected from the group consisting of platinum, palladium, rhodium, ruthenium, iridium, osmium, silver, gold and mixtures thereof.

17. The water gas shift process of claim 16, wherein rhenium comprises from about 0.05 to about 10% of the catalyst, by weight.

18. The water gas shift process of claim 16, wherein the high surface area material of the support comprises ceria and zirconia.

19. The water gas shift process of claim 16, wherein a dopant is added to the catalyst, and wherein the dopant is selected from the group consisting of Ga, Nd, Pr, W, Ge and Fe, their oxides and mixtures thereof.

20. The water gas shift process of claim 16 wherein the feed stream is passed over the water gas shift catalyst at a temperature from about 550° C. to 900° C.

* * * * *